(12) United States Patent
Ciaciuch

(10) Patent No.: US 8,533,128 B1
(45) Date of Patent: Sep. 10, 2013

(54) TEMPERATURE RETENTION AND WEATHERIZATION BLANKET SYSTEM

(76) Inventor: James Walter Ciaciuch, Port Angeles, WA (US)

(*) Notice: Subject to any disclaimer, the term of this patent is extended or adjusted under 35 U.S.C. 154(b) by 0 days.

(21) Appl. No.: 13/398,152

(22) Filed: Feb. 16, 2012

(51) Int. Cl.
*G06F 17/00* (2006.01)

(52) U.S. Cl.
USPC .......................................... 705/412

(58) Field of Classification Search
USPC .......................... 705/412, 400, 1.1
See application file for complete search history.

(56) References Cited

U.S. PATENT DOCUMENTS

| | | | |
|---|---|---|---|
| 3,857,432 A | 12/1974 | Russell | |
| 4,167,205 A | 9/1979 | Gerdeman | |
| 4,391,865 A | 7/1983 | Constance | |
| 4,673,019 A | 6/1987 | Silverthorne et al. | |
| 4,679,609 A | 7/1987 | Bateman | |
| 4,950,869 A | 8/1990 | Mueller | |
| 5,271,449 A * | 12/1993 | Herrick | 160/368.1 |
| 5,295,527 A | 3/1994 | West | |
| 5,544,690 A * | 8/1996 | Magro et al. | 160/133 |
| 6,209,614 B1 | 4/2001 | Smoot | |
| 6,802,551 B2 * | 10/2004 | Nelson | 296/24.41 |
| 7,131,481 B2 | 11/2006 | Varley et al. | |
| 8,016,014 B2 | 9/2011 | Crider et al. | |
| 2002/0000301 A1 | 1/2002 | Rolin | |
| 2008/0065427 A1 * | 3/2008 | Helitzer et al. | 705/4 |

FOREIGN PATENT DOCUMENTS

DE 29721672 U1 3/1998
DE 29721672 U1 * 5/1998

* cited by examiner

*Primary Examiner* — Igor Borissov
(74) *Attorney, Agent, or Firm* — Virginia P. Shogren

(57) ABSTRACT

A multi-layered, dual purpose thermal blanket constructed from materials rendering a first blanket side heat reflective and a second blanket side wind resistant. Blanket may be utilized in temperature retention and weatherizing systems for storage units, lockers and bins. System for units having roll up doors comprises blanket support assembly to retain blanket across doorway and insulated enclosure around roll up door assembly. System optionally further includes a sensor interface in association with the blanket to receive data including an open or closed position of the blanket. A graphics generator presents the data as correlated to mappings and calculates time periods during which the blanket is left in an open position. Associated fees may be calculated as a penalty for leaving blanket open while storage unit is unattended.

14 Claims, 7 Drawing Sheets

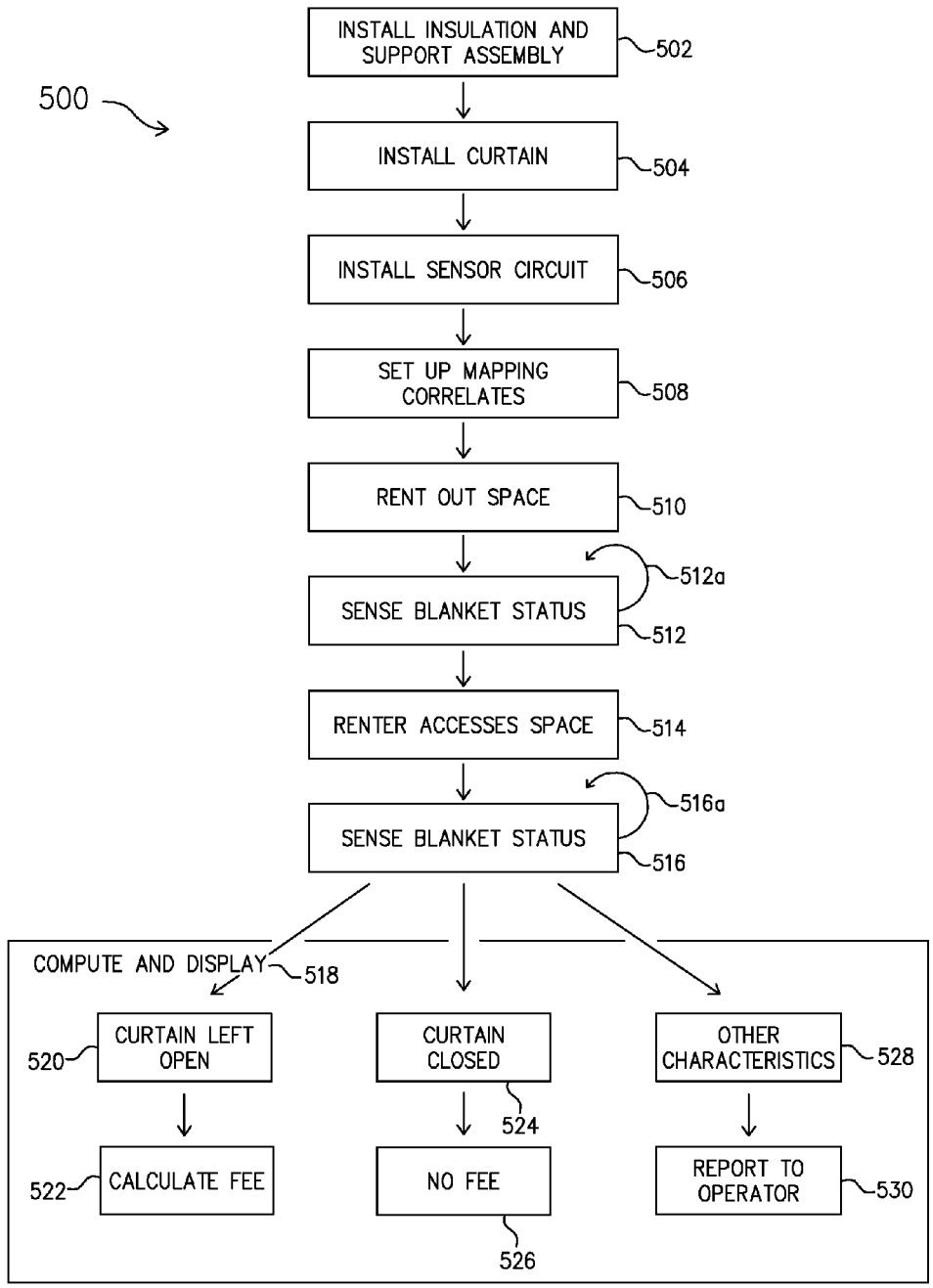

FIG. 6

Fashion's Creek Self Storage, LLC
Weatherization Blanket Monitoring System Activity Log

| Date | Time | Unit# | Name | Curtain Open/Closed | Unit Size | Daily Energy Fee | Days Open | Energy Fee Charged | Auto Charge | Manual Charge |
|---|---|---|---|---|---|---|---|---|---|---|
| 1/1/2012 | 9:30:04 am | A101 | Landau | Open | 10x30 | $5.00 | 0 | | | |
| 1/1/2012 | 10:17:33 am | | | Closed | | | | | | |
| 1/5/2012 | 11:42:51am | B114 | Sharp | Open | 10x10 | $4.00 | 5 | $20.00 | ✓ | |
| 1/10/2012 | 3:51:55 am | | | Closed | | | | | | |
| 1/3/2012 | 6:10:00 am | C141 | Cameron | Open | 5X10 | $2.00 | 6 | $12.00 | ✓ | |
| 1/9/2012 | 8:05:12 am | | | Closed | | | | | | |
| 1/6/2012 | 5:03:29 pm | F148 | Bates | Open | 12x25 | $5.00 | 1 | $5.00 | | ✓ |
| 1/7/2012 | 5:17:40 pm | | | Closed | | | | | | |
| 1/6/2012 | 5:17:46 pm | E115 | Clayton | Open | 10x15 | $4.00 | 0 | | | |
| 1/6/2012 | 6:00:15 pm | | | Closed | | | | | | |
| 1/11/2012 | 1:10:59 pm | D151 | Fadden | Open | 5x5 | $2.00 | 12 | $24.00 | ✓ | ✓ |
| 1/23/2012 | 7:52:31 am | | | Closed | | | | | | |
| 1/10/2012 | 2:00:00 pm | F120 | Tidely | Open | 6x10 | $3.00 | 3 | $9.00 | | ✓ |
| 1/13/2012 | 4:09:17 pm | | | Closed | | | | | | |
| 1/12/2012 | 10:06:28am | D110 | Jackson | Open | 10x20 | $4.50 | 18 | $81.00 | | |
| 1/30/2012 | 3:47:34 pm | | | Closed | | | | | | |
| 1/13/2012 | 8:52:03 am | A119 | Ladenstot | Open | 10x10 | $4.00 | 0 | | | |
| 1/13/2012 | 9:01:22 am | | | Closed | | | | | | |
| 1/10/2012 | 3:06:16 pm | F154 | Spencer | Open | 12x25 | $5.00 | 5 | $15.00 | ✓ | ✓ |
| 1/15/2012 | 6:45:05 pm | | | Closed | | | | | | |
| 1/14/2012 | 8:34:23 am | E158 | Grady | Open | 10x25 | $4.50 | 2 | $9.00 | | |
| 1/16/2012 | 4:44:19 am | | | Closed | | | | | | |
| 1/11/2012 | 2:36:47 pm | F108 | Smith | Open | 6x10 | $3.00 | 0 | | | |
| 1/11/2012 | 3:10:54 pm | | | Closed | | | | | | |
| 1/16/2012 | 9:31:13 am | C131 | Charles | Open | 5x10 | $2.00 | 2 | $4.00 | ✓ | |
| 1/18/2012 | 9:42:10 am | | | Closed | | | | | | |
| 1/10/2012 | 11:42:51am | A109 | Parson | Open | 10x10 | $4.00 | 3 | $12.00 | | ✓ |
| 1/13/2012 | 3:51:55 am | | | Closed | | | | | | |

Daily Energy Fee's
5X5 $2   10X15 $4
5X10 $2  10X20 $4.50
10X5 $2  10X25 $4.50
6X10 $3  10X30 $5
10X10 $4 12X25 $5
Effective 1/1/2012 ns; 3) maintains a relatively steady temperature within a unit and prevents the unit from becoming too warm or too cold; 4) can adequately protect storage unit contents from extreme temperature fluctuations; 5) does not require expensive infrastructure or a large investment of resources; 6) does not consume significant amounts of energy to maintain and can significantly reduce energy costs; 7) does not require adding insulating layers directly to the door or otherwise interfering with performance of the door; 8) reduces or eliminates air filtration (both warm air and cold air) not only through the door, but also at side margins, door jambs, headers and wall areas surrounding the door; 9) is universally applicable to all existing storage unit door systems whether roll-up or man-doors; 10) does not increase the energy cost associated with the unit; 11) can be a source of extra income for the storage unit owner/operator; 12) does not take up overhead or floor space; 13) withstands harsh handling conditions; and 14) is not overly complicated for the typical storage unit operator and owner to install, reconfigure, maintain and use.

TEMPERATURE RETENTION AND WEATHERIZATION BLANKET SYSTEM

FIELD OF THE INVENTION

This invention relates generally to temperature retention and weatherization systems, and more particularly to an apparatus and system comprising a dual purpose layered thermal blanket with opposed surfaces providing wind and heat resistance, an optional sensor interface in association with the blanket to receive and report data indicating an open or closed position of the blanket, and a weatherizing system for storage units, lockers and bins (collectively "units") utilizing the blanket.

BACKGROUND OF THE INVENTION

Storage unit facilities are typically constructed from metal, wood, siding and concrete block materials that pass through external temperature fluctuations on a daily basis as well as in general with the changing of seasons. During summer, the units and stored contents may be subjected to extreme high temperatures; during the winter months, the units may go below freezing. The contents of the units are subjected to these temperature variations with resulting damage to stored items.

One of the primary concerns of storage facility owners, operators and renters is finding a space that has a relatively small fluctuation in temperature, thereby limiting temperature extremes. To avoid extreme temperature fluctuations, some operators of storage units have added radiant floor heat, forced air heat, wall and ceiling insulation, and/or heating units within the storage space. These features are cost intensive to purchase and install, add to the cost of the storage unit for the consumer, and consume significant amounts of energy to maintain. The additional energy costs may be so high as to render them impractical.

Some operators have attempted to reduce their energy costs by adding bubble foil insulation and other bubble like materials with foil insulating layers applied directly to the back (interior surface) of the corrugated metal storage unit doors in an effort to insulate the metal. However, these layers interfere with, or in some cases prevent, the doors from being rolled up within the roller assemblies as the door is raised. In addition, the foil layers do not prevent heat loss or gain, depending on the external temperature, at the side margins of the roll-up doors. Moreover, the foil layers are adhered to the interior surface of the roll-up doors with double-sided tape that over time and repeated use deteriorates causing the foiled material to fall away from the door itself. To avoid these problems, a flat garage-type door, that can be readily insulated, could be utilized. However, within the storage unit industry, flat garage-type doors are not desired, because when opened they take up significant ceiling area space and are difficult to securely latch and lock or overlock in a closed position.

As a result, many storage unit operators are willing to provide a heated or cooled unit only if the renter pays an additional fee sufficient to cover the cost of energy for maintaining a more constant temperature. However, those additional energy costs can quickly spiral out of control in most climates, thereby rendering the systems not cost-effective and a profit loss for the typical storage unit operator.

Accordingly, there is an as of yet unmet need in the art for a temperature retention and weatherization system for units that: 1) does not pass through external temperature fluctuations on a daily basis; 2) does not pass through external temperature fluctuations in general with the changing of seasons;

THE INVENTION

Summary of the Invention

The Temperature Retention and Weatherization Blanket System of this application comprises a blanket constructed from a plurality of layered materials rendering a first side of the blanket with a primarily heat reflective quality and an opposed second side of the blanket with a primarily wind resistant quality. The blanket comprises a plurality of layered materials including double-sided waterproof polyethylene tarp, recycled denim padding, polyester lining, aluminized polyester heat reflective material, and waterproof air restrictive barrier material. The blanket may optionally further comprise conductive hook and loop fasteners and a sensor interface to sense data regarding an open position or a closed position of the blanket system.

A weatherization system utilizing the blanket for a constructed space generally defined by two side walls, a back wall, a ceiling, a floor, a door opening, a door and a door roll up assembly proximate the ceiling capable of raising and lowering the door, comprises: 1) a thermal blanket spanning the door opening, said blanket having opposed top, bottom and side margins, a first side and an opposed second side; 2) a support assembly spanning the door opening and retaining the top margin of the blanket in a generally vertical orientation spaced proximate the door opening, said assembly capable of retaining the blanket in an open position and a closed position; and, 3) a set of insulation board panels mounted to a frame enclosing the roll up door assembly.

The system may optionally further include: 1) one or more mappings, each mapping correlating a characteristic of the space with a desired predetermined physical characteristic of the space; 2) a sensor interface in association with the blanket to receive data including measurements of the characteristics of the space; and, 3) a graphics generator to prepare a presentation of the characteristics of the space as correlated to the mappings. The presentation of the characteristics as correlated to the mappings may comprise a calculation and presentation of a period of time for a blanket left in the open position, and a corresponding calculation and presentation of a penalty fee.

BRIEF DESCRIPTION OF THE DRAWINGS

The invention is described in more detail with reference to the attached drawings, in which:

FIG. 5 is a block diagram of an exemplary method for utilizing the Temperature Retention and Weatherization Blanket System;

FIG. 6 is an exemplary Weatherization System Status Report of data and associated penalty fees, where appropriate, calculated on faulty usage of the Temperature Retention and Weatherization Blanket System; and, FIG. 7 is a partial top cross-sectional view of an exemplary overlap design for two blanket panels.

DETAILED DESCRIPTION OF THE ILLUSTRATIVE EMBODIMENT

Figure 1:
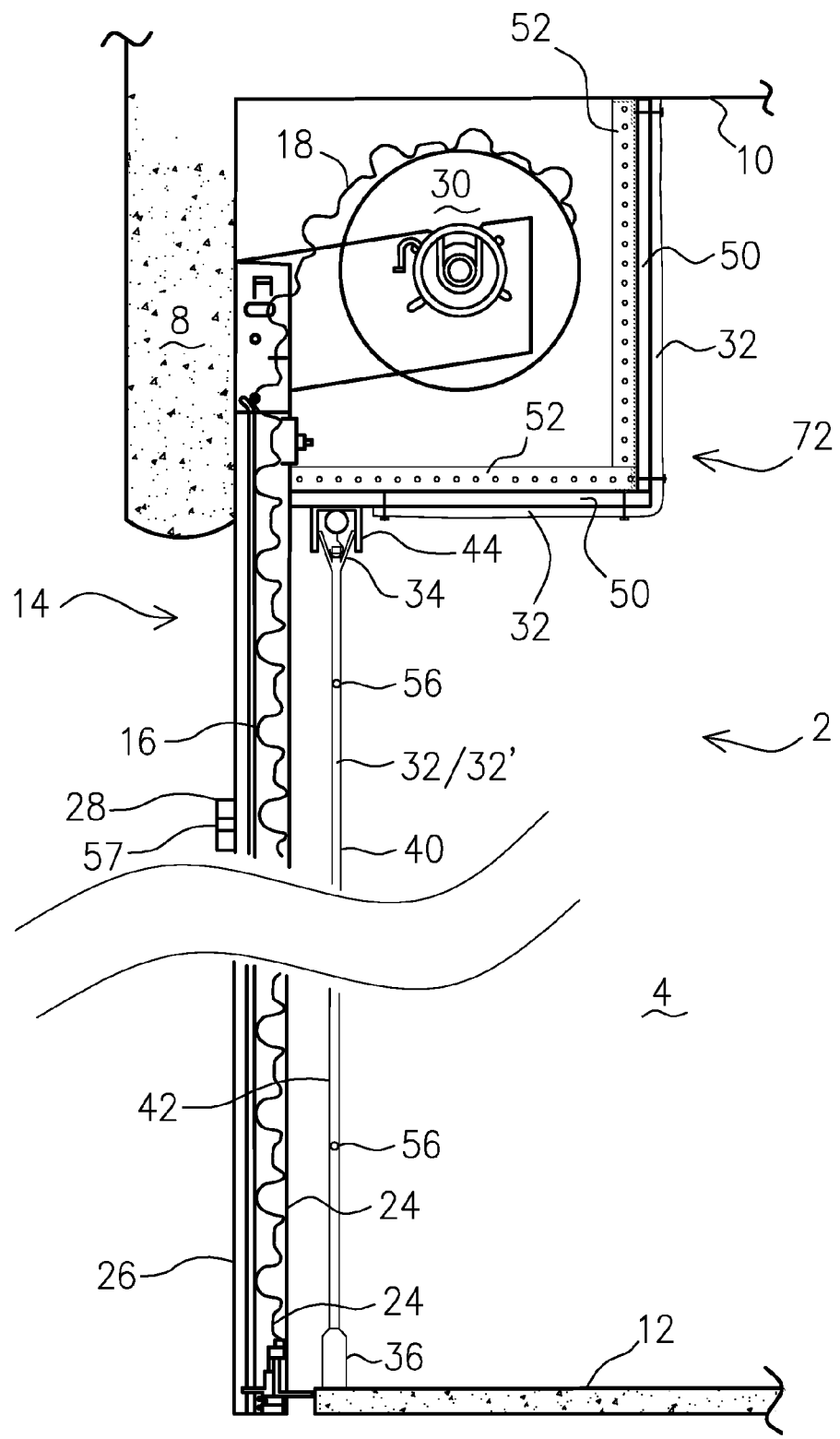
FIG. 1 is a cross sectional side plan view drawing of the Temperature Retention and Weatherization Blanket System installed proximate an exemplary roll up unit door.

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the diagrams show in schematic, or omit, parts that are not essential in that diagram to a description of a particular feature, aspect or principle of the invention being disclosed. Thus, the best mode embodiment of one feature may be shown in one diagram, and the best mode of another feature will be called out in another diagram.

In general, the Temperature Retention and Weatherization Blanket System of this application comprises a temperature and weatherization system for units and applies to various door sizes and designs, including without limitation, roll up doors, man doors and garage doors. The system comprises a thermal blanket mounted parallel to the door, but spaced apart from the door, constructed of layers that render one side of the blanket resistant to warm external weather, and the opposed side of the blanket resistant to cool external weather. The system may additionally include panels mounted around a door roll up assembly to further prevent air flow, and a sensor system to monitor, among other potential characteristics within the space, whether the blanket has been properly closed upon departure by a renter. The system optionally tracks the blanket status and is programmed to report and calculate a penalty fee for units wherein the blanket has been left open upon departure. The apparatus may be installed proximate any door design and does not interfere with roll up assemblies.

The thermal blanket: 1) reduces both daily and seasonal temperature fluctuations within the storage space, thereby weatherizing the space; 2) maintains a relatively steady temperature within a unit to help maximize conditions for stored items; 3) does not require expensive infrastructure or a large investment of resources to install; 4) does not consume significant amounts of energy to maintain; 5) does not require adding insulating layers directly to the door, walls or exterior building components, or otherwise interfering with performance of the door or roll up assembly; 6) is universally applicable to all existing storage unit door systems; 7) does not significantly increase the energy cost associated with the unit; 8) reduces or eliminates air filtration (both warm air and cold air) not only through a door, but also at side margins, wall panels, header panels, and wall areas surrounding a door; 9) can be a source of extra income for the storage unit owner/operator in the form of fees assessed against renters who fail to properly close the blanket upon departure; and 10) is not overly complicated for the typical storage unit operator and owner to install, reconfigure, maintain and use.

Temperature Retention and Weatherization Blanket System

FIG. 1 shows a cross sectional side plan view of the Temperature Retention and Weatherization Blanket System 2 installed proximate an exemplary storage unit door 16. Referring to FIG. 1, the storage unit space 4 generally comprises a constructed area defined by a ceiling 10, a floor 12, side walls (not shown in the cross sectional view of FIG. 1) and a door opening 14. A corrugated metal door 16 is shown in a closed position sealing the door opening 14. A door latch 28 is located proximate a side margin 22 of the door 16.

Proximate the ceiling 10, a set of two insulated panels 50 retained by reinforced metal brackets 52 form an L-shaped enclosure 72 spanning the width of the unit 4 and enclosing the door roll up assembly 30. The panels 50 block air flow through gap openings defined by the door 16 and door top margin 18. The panels 50 are insulated R9 wall panels and may optionally be further insulated with panel sheets of thermal blanket 32 affixed to the internal face of the panels 50. In addition to preventing air flow in and out of the space 4 from around the roll up assembly 30, the enclosure 72 protects items stored within the space 4 from hitting or otherwise coming into contact with the roll up door assembly 30 and associated damage to the stored item when the door 4 is opened or closed.

Referring to FIG. 1, the inventive system 2 comprises a thermal blanket 32 spanning the door opening 14. The blanket 32 has opposed top and bottom margins 34/36. A first side 40 of the blanket 32 faces inwards into the space 4, and an opposed second side 42 of the blanket 32 faces outwards towards the door opening 14. A support assembly 44 spans the door opening 14 and retains the top margin of the blanket 34 in a generally vertical orientation spaced apart from, but proximate to, the door opening 14. The top margin 34 of the blanket 32 forms a general "Y" shape in cross section. A series of holes (not shown) are formed at the base of the "Y" to accept a series of hook ends descending from the support assembly 44. The blanket 32 slides laterally within the support assembly 44 as it is opened or closed.

As shown and discussed in connection with FIGS. 4 and 5, infra, the blanket 32 is multi-layered and serves a dual purpose. Based on selected materials for the differing blanket layers, the first side of the blanket 40 is generally heat reflective. The second side of the blanket 42 is generally wind resistant. As a result, when the external climate is generally hot, such as during the summer, the first side 40 of the blanket 32 is optimally exposed to the doorway 14. When the external climate is generally cold, such as during the winter, the second side 42 of the blanket 32 is optimally exposed to the doorway 14.

Referring to FIG. 1, the system 2 may further comprise a weighted bottom margin 36 for the blanket 32 to seal the blanket 32 to the floor 12. The weights may be of any suitable or desired materials or combinations thereof, including without limitation, sand, gravel and/or a metal chain. The weights may be evenly distributed along the length of the blanket 32 bottom margin 36. Alternately, the weights may be isolated within a portion of the bottom margin 35 as further discussed in connection with FIG. 3, infra.

Referring to FIG. 1, the system 2 comprises a series of wires 56 sewn within the blanket or affixed to the blanket 32 to monitor the blanket 32 position (open or closed). The wires 56 are connected via a 22 gauge wire to conductive hook and loop fastener strips 54 sewn onto a blanket layer (as shown in FIG. 4). A relay sensor 57 is located proximate the door latch assembly 28. Most existing storage unit door systems provide a hard-wired sensor 57 within the latch 28 to monitor the open or closed status of the door 16. In the inventive system of this application 2, the sensors within the blanket 32 are in operative communication with the hard-wired sensor 57 in the latch assembly 28. Alternately, wireless sensors may be installed and utilized in conjunction with new or old construction and the installation of the system.

Referring to FIG. 1, the system 2 may further comprise a set of insulation board panels 50 mounted over and around the metal frame 52 surrounding the roll up assembly 30. The board panels 50 may be further insulated with a second layer comprising a thermal blanket panel 32 mounted thereon.

While a metal roll up door 16 is shown in FIG. 1, it should be understood that the system 2 may be mounted in relation to any type of unit door, including man doors, roll up doors, garage doors or a combination thereof, and the doors may be constructed of any suitable or desired materials, including metal, wood, composites and the like.

Figure 2:
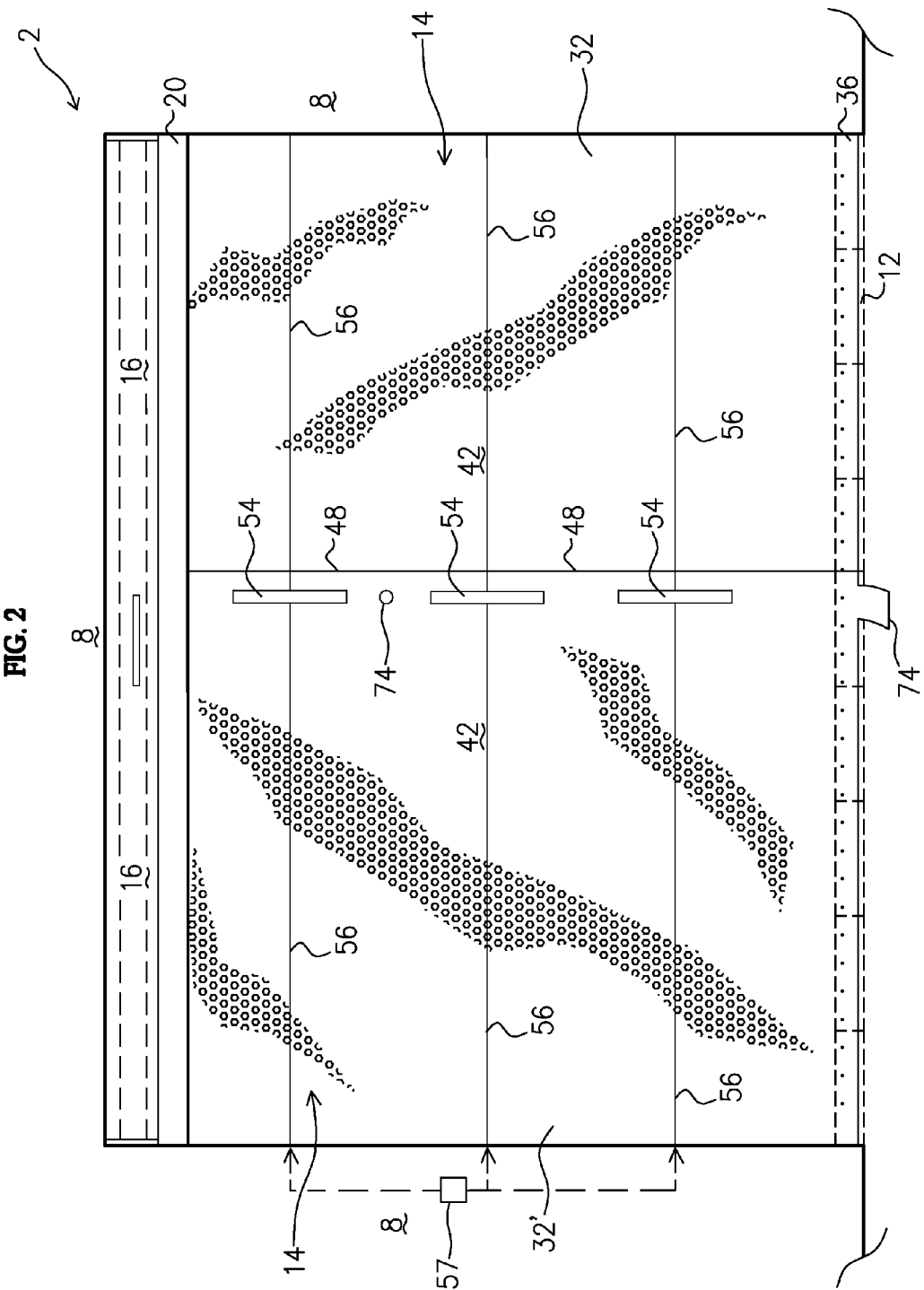
FIG. 2 is a front plan view drawing from outside an exemplary storage unit with metal door raised and thermal blanket spanning the doorway in a closed position.
Figure 3:
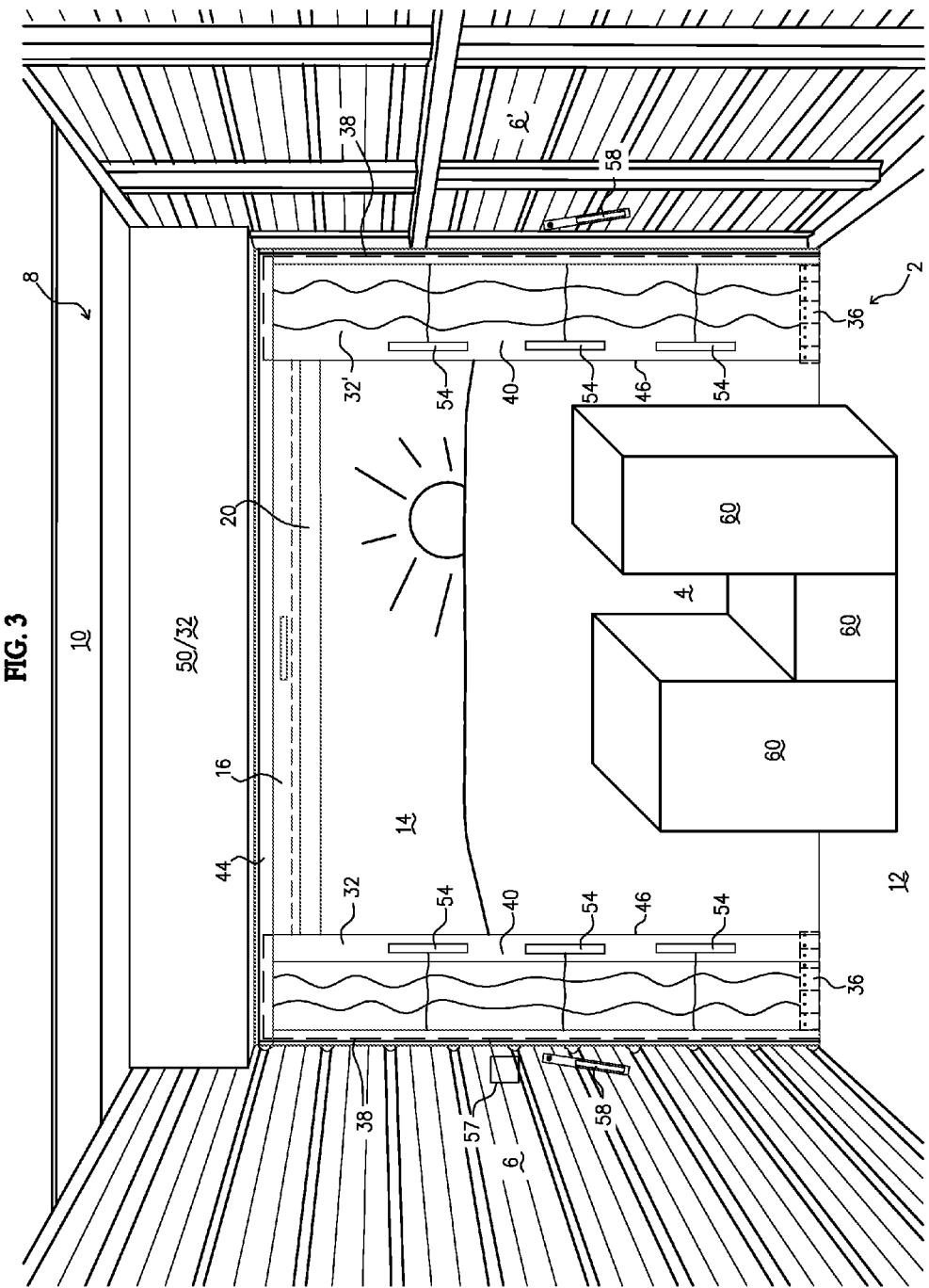
FIG. 3 is a rear plan view drawing from inside an exemplary storage unit with a Temperature Retention and Weatherization Blanket System installed proximate the storage unit door with thermal blanket in an open position.

FIG. 2 shows an exemplary storage unit 8 from the outside with metal door 16 raised and thermal blanket panels 32/32' spanning the doorway 14 in a closed position 48. FIG. 3 shows the same storage unit 8 from the inside, with the inventive system 2 installed proximate the doorway 14, with thermal blanket panels 32/32' in an open position 46.

Referring to FIGS. 2 and 3, upon raising the door 16 to a storage unit 8 with the inventive system 2 installed therein, a user first encounters the thermal blanket panels 32/32' in a closed position 42 spanning the doorway 14. Referring to FIG. 2, the second side of the blanket 42 is shown facing outwards towards the viewer. The blanket panels 32/32' are retained in the closed position 48 by a series of three vertically oriented hook and loop strip fasteners 54 within the area of overlap. An alternate overlap design for the panels 32/32' is shown and described in connection with FIG. 7, infra. The strip fasteners 54 are electrically conductive and are connected via 22 gauge wire to the wires 56 sewn into the blanket and the relay sensor 57. A light indicator 74, also positioned within the area of overlap, emits light when the blanket panels 32 are correctly closed and the conductive strip fasteners 54 carry a circuit. The light indicator 74 may be a light emitting diode or any suitable or desired bulb emitting white or colored light. The light indicator 74 is installed through all blanket layers to render it visible from either side. Alternately, two light indicators may be sewn onto opposed sides of the blanket panel. The bottom margin of the blanket 36 is shown resting against the ground. A generally rectangular material tab 76 is securely attached to the bottom margin of the blanket 36. As more fully described in connection with FIG. 7, infra, the tab 76 may be stepped on by a user to keep the panels 32 taut while closing the panels 32/32'.

It should be understood that the connection between blanket panels 32/32' may be achieved through any suitable or desired means, including without limitation, non-conductive or conductive hook and loop fasteners, snaps, snap buckles, snap hooks, spring hooks, zippers, grommets and the like.

Referring to FIG. 3, to access the interior space 4 within the unit 8, a user manually separates the hook and loop strips 54, thereby breaking the circuit, and pushes the blanket panels 32/32' toward the side walls of the unit 6, 6'. The support assembly (shown in FIG. 1) permits smooth sliding movement of the blanket panels 32/32' in the opposed lateral directions. As shown in FIG. 3, the blanket panels 32/32', once pushed to the sides 6/6', fold against themselves in a pleated pattern thereby providing clear access in and out of the doorway 14 to the space 4. Alternately, a user may tie the blanket panels 32/32' to each side 6, 6' using any suitable or desired ties 58. The ties 58 in FIG. 3 are shown attached to the unit side walls 6, 6' but could be sewn onto the blanket panels 32/32'. In addition, where weights are isolated within the blanket 32/32' bottom margin 36 proximate the area of overlap 48 shown in FIG. 2, those weights may retain the blanket panels 32/32' in the desired open position 46 as the blanket panels 32/32' are manually pushed and slid in opposed lateral directions as shown in FIG. 3.

Referring to FIGS. 2 and 3, a user accesses the unit 8 as desired for storage or removal purposes. Upon completion of the desired task within the unit 8, the user exits the unit 8, pulls the blanket panels 32/32' toward each other until they overlap at a desired location such as proximate the center of the doorway 14 or proximate a side wall 6, closes the panels 32/32' using the hook and loop fastener strips 54, thereby re-setting the wire circuit 56 within the blanket 32/32', lowers the door 16, locks the door via the latch assembly 28 (shown in FIG. 1) and leaves the premises.

Referring to FIGS. 2 and 3, if the panels 32/32' are left in a closed position 42, the thermal blanket 32/32' serves the purpose of keeping the space 4 warmer by acting as a wind resistant layer between the door 16 and the stored items 60. If, conversely, the first side of the blanket 40 is mounted to face outside the unit 8, the thermal blanket 32/32' serves the purpose of keeping the space cooler by acting as a heat reflective layer between the door 16 and the stored items 60. If a user fails to securely close the blanket 32 upon departing the unit 8, the benefit of the blanket 32/32' is largely lost. While the blanket opening shown in FIGS. 2 and 3 is generally central to the door opening 14, it should be understood that the blanket panels 32/32' could be designed and installed in any suitable or desired configuration, including without limitation, locating a blanket 32 opening proximate one or both side walls 6, 6'.

Figure 4:
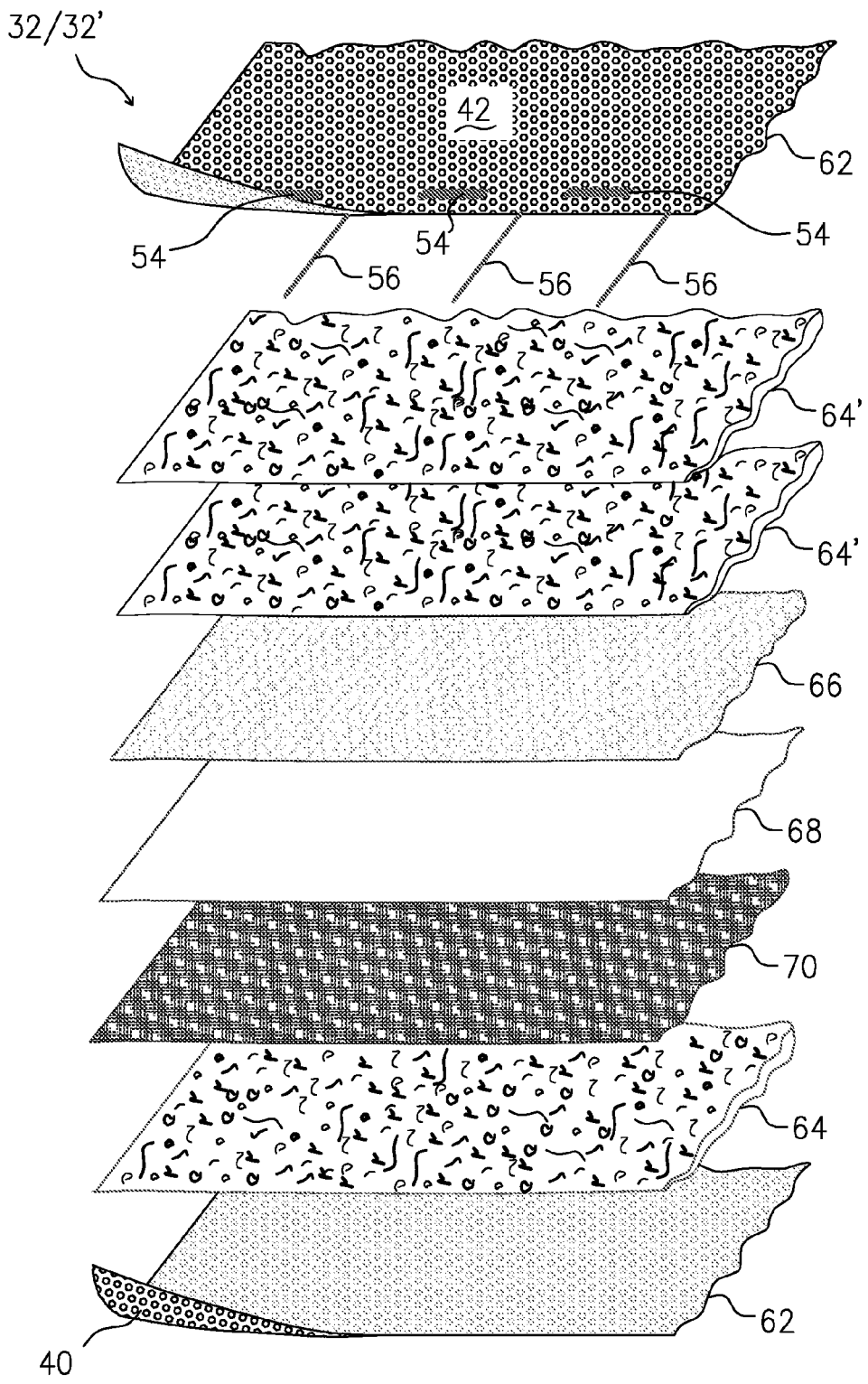
FIG. 4 is an exploded partial view of exemplary combination of layers within a thermal blanket weatherization blanket rendering a different quality for each blanket side.

FIG. 4 shows an exploded partial view of eight exemplary layers making up the thermal blanket 32/32'. The layers are selected to provide a different quality for each blanket side 40/42 and are also selected to provide a blanket that can withstand harsh handling conditions. The first blanket side 40, when mounted facing outside the unit, provides heat reflective qualities desired in a hot climate or season. The second blanket side 42, when mounted facing outside the unit, provides wind resistant qualities desired in a cold climate or season and keeps warm air inside the unit.

Reviewing the layers from bottom to top as shown in FIG. 4, a first blanket side 40 comprises a soft polyethylene-based double-sided waterproof tarp material. The waterproof material, ranging from five to twenty millimeters thick, protects the blanket layers 32/32' from water or moisture-related damage. A second layer 64 comprises a sheet panel of recycled denim padding between ⅛ and ¾ inches thick and comprising tightly knit cotton twill fibers. A third layer 70 comprises a sheet panel of insulating Mylar® polyester lining from ⅛ to ¼ inches thick. A fourth layer 68 is a sheet panel of aluminized polyester heat reflective material from 1 to 8 millimeters thick. Adjacent the aluminum 68 is a panel sheet of waterproof air restrictive barrier material 66 from one to eight millimeters thick. The sixth and seventh layers 64' are both sheet panels made from recycled denim padding (tight-knit cotton twill fibers) between ⅛ and ½ inches thick. The final layer for the outer second side of the blanket 42 comprises another layer of double-sided waterproof soft tarp 62 between five and twenty millimeters thick.

Referring to FIG. 4, the layers adjacent the first blanket side 40 are selected for their heat reflective qualities, namely, tightly knit cotton fibers 64, soft thermal 70 and aluminum reflective 68. Conversely, the layers adjacent the second blanket side 42 are selected for their wind resistant qualities, namely dual layers of tightly knit cotton fibers 64' and airflow prevention 66. In use, as discussed more in connection with FIG. 5, a user may select a side 40/42 to mount facing outside the unit 8, depending on the general climate or seasonal climate external to the unit (cold or hot), to maximize the effectiveness of the weatherization and corresponding energy savings provided by the system 2.

The layers as shown in FIG. 4 appear thin with the exception of the recycled denim layers 64, 64'. It should be understood that any suitable or desired thickness, numbers of layers, and/or materials may be utilized in connection with the present invention depending on the overall climate conditions for the unit or the desired temperature retention and weatherization for the unit space.

Referring to FIG. 4, the blanket 32/32' alternately further comprises one or more wires 56. The wires 56 shown in FIG. 4 are connected via 22 gauge wire to conductive hook and loop fasteners 54 sewn into or otherwise affixed to the second side 42 of the blanket 32/32'. It should be understood that any suitable or desired configuration or positioning of the wires 56 and corresponding fasteners 54 may be utilized in the present invention via a wired connection.

The blanket 32/32' may further include electric radiant heat conductors for supplying additional heat to the space 4 when desired.

In addition, the blanket sides 40/42 may be color coded or otherwise marked to provide notice to the installer for which side 40/42 should face the unit space 4 depending on the external climate (warm or cool), the internal temperature of the space 4, and desired function of the blanket 32/32'.

Method of Installation

One of the primary advantages to the Temperature Retention and Weatherization Blanket System of this application is its ease of installation and adjustment depending on the general climate conditions external to the storage unit and desired temperature inside the unit. The universal aspect of the system 2 permits it to be sold as a kit with instructions for installation in all climate conditions.

FIG. 5 shows a series of exemplary steps 500 for a method of installing and utilizing the Temperature Retention and Weatherization Blanket System. As demonstrated by the method described in FIG. 5, the system is capable of achieving various goals, including optimal weatherization (preventing excess heat gain/keeping unit cool during summer and preventing excess cooling/keeping unit warm during winter) for the storage space, potential corresponding savings in energy costs, and an income stream to the operator to recoup increased energy costs from renters who fail to adequately utilize the weatherization system.

Referring to FIGS. 1 and 5, in step 502, a support assembly 44 is installed along with any other desired added insulation 50/32 for the system 2. The insulation may be mounted to enclose the roll up assembly 30 for the metal door and may consist of insulating boards 50 and/or thermal blanket material 32/32'. The support assembly 44 is mounted beneath the roll up assembly 30, is spaced from the door 16 so as not to interfere with the door's 16 movements, and can be mounted by any suitable or desired means, including brackets, screws, and the like.

Referring again to FIGS. 1, 4 and 5, in step 504, the top margin 34 of the thermal blanket 32/32' is attached to the support assembly 44 in a hanging position. The blanket 32/32' may be oriented with the first side 40 facing toward the inside of the unit 8, or the second side 42 facing toward the inside of the unit 8. For optimal function, the first side 40 of the blanket 32/32' is mounted within the support assembly 44 facing the space 4 for a period of time characterized by a generally cold climate external to the space 4. Conversely, the second side 42 of the blanket 32/32' is mounted within the support assembly 44 facing the space 4 for a period of time characterized by a generally warm climate external to the space 4.

Monitoring Storage Unit Space Characteristics

Referring to FIGS. 1, 4 and 5, in step 506, the hook and loop circuit 54 of the blanket 32/32' is established in operative communication with a hardwired or wireless relay sensor 57 on a wall proximate the door latch assembly 28.

In step 508, the owner/operator of the unit establishes mappings to correlate a characteristic of the space with a desired predetermined physical characteristic of the space. For example, the sensors may sense the blanket 32/32' in an open position. The desired physical characteristic is a closed blanket. While the preferred physical characteristic to be sensed within the unit is the open or closed position of the blanket 32/32', it should be understood that various other physical characteristics could be desired (and therefore sensed and monitored) within the space, including without limitation, a temperature range, a minimum temperature, a maximum temperature, a humidity level, an emission of light, an odor, a sound, a localized heat source, and/or a presence of smoke.

Referring to FIGS. 1 and 5, in step 510, the space is then rented to a user. The user is instructed as to how to use the blanket 32/32', including the requirement to close the blanket 32/32' upon each departure from the unit 8. The user may further be advised of the dual purpose nature of the blanket 32/32' and be given the option to change the orientation of the first and second sides 40/42 of the blanket 32/32' consistent with seasonal changes in a climate external to the space 4, such as summer and winter. The user proceeds to access the space 4 for storage purposes 60. Upon departing the space, the user closes the blanket 32/32' and locks the door 16, thereby completing the sensor 54 circuit.

Referring to FIGS. 2 and 5, in steps 512 and 512a, the sensors 54/56/57 sense the closed blanket position 48. The closed blanket 48 provides the desired temperature retention weatherized conditions for the internal space 4 within the unit 8, thereby assisting in protecting the stored items 60 from damage, reducing energy costs in heating or cooling the unit 8, and saving energy for the storage facility.

Referring to FIGS. 2, 3 and 5, in step 514, the renter returns to the unit 8 to access a stored item 60. However, upon departure, the renter fails to adequately close the blanket 32/32' before closing and locking the door 16. In step 516 and 516a, the sensors 54 are unable to complete a circuit due to the blanket 32/32' left in an open position 46.

Step 518 of FIG. 5 shows possible outcomes following the renter's departure from the unit 8. In step 520, the blanket 32/32' is left open 46. A graphics generator, such as a computer or hand-held device, prepares a presentation of the characteristics of the space 4 (for example, blanket left open 46) as correlated to the mappings (for example, blanket should be closed). The computer may be programmed to present the information in any suitable or desired manner, including without limitation, a text-based e-mail, a text-based instant message, an update to an activity log, and/or a graphic drawing or image sent to an operator of the storage facility.

Referring to step 522 of FIG. 5, the computer may be further programmed to calculate and present a fee amount corresponding to a period of time during which the blanket 32/32' is left in the open position 46. This penalty fee may be added to an invoice for the renter to offset or cover the additional energy costs associated with heating or cooling the unit 8 absent a closed blanket 32/32'.

In step 524, it is assumed that the blanket 32/32' is left in a closed position 48 upon the renter's departure. A graphics generator, such as a computer or hand-held device, may be programmed to prepare a presentation for these characteristics of the space (for example, blanket left closed 48) as correlated to the mappings (for example, blanket should be closed). The computer may be programmed to present the information in any suitable or desired manner, including without limitation, a text-based e-mail, a text-based instant message, an update to an activity log, a graphic drawing or image.

Referring to FIG. 5, in step 528, other characteristics of the space 4 are monitored as correlated to desired physical characteristics for the space 4, and in step 530, those characteristics are reported and presented. Examples of these physical characteristics include a temperature range, a minimum temperature, a maximum temperature, a humidity level, an emission of light, an odor, a sound, a localized heat source, and/or a presence of smoke.

FIG. 6 shows an exemplary Weatherization Blanket Monitoring System Activity Log 600 containing data and associated penalty fees calculated for faulty usage of the Temperature Retention and Weatherization Blanket System 2 as reported by a facility operator 601. Column 602 contains data for a date of the activity; column 604 contains data for a time of the activity; column 606 contains data for a unit number; column 608 contains data for a renter's name or other identifying information; column 610 contains data for a blanket status (open/closed); column 612 contains data for the unit size; column 614 contains a representation of the "Daily Energy Fee" that would be charged in a dollar amount corresponding to the unit square footage size 612 and a fee schedule (Box 624); column 616 contains data for the number of days the blanket has been left in an open status; column 618 contains data for an "Energy Fee Charged"; column 620 contains check marks for "Auto Charge" whereby the operator 601 has the system 2 electronically integrated with existing software for the facility; column 622 contains check marks for an alternate status entitled "Manual Charge", whereby the operator does not have existing software integration and must manually enter charges.

Referring to FIG. 6, column 610 contains data for a blanket status (open/closed). Column 616 contains data for a period of time that the blanket has been left in an open status with an associated assessed "energy fee" calculated on a per diem basis as shown in Column 618. While the fee assessment shown in column 618 is on a per diem basis for a particular square footage for the unit 624/612, it should be understood that any suitable or desired calculation of the assessment may be utilized, including without limitation, a fee calculated on the period of time the blanket is left in an open position following electronic notice to the renter of the open blanket status. The software may be further programmed to interface with other software, including existing monitoring programs utilized by the storage facility operator.

Referring to FIGS. 5 and 6, the system 2 of this application may further comprise a computer implemented method of tracking utilization of the system 2 for an internal constructed space. The method comprises the operations of: 1) providing the space generally defined by two side walls, a back wall, a ceiling, a floor, door opening, and a door; 2) providing a thermal blanket spanning the door opening, a support assembly spanning the door opening retaining the top margin of the blanket in a generally vertical orientation spaced proximate the door opening, said assembly capable of retaining the blanket in an open position and a closed position; 3) receiving one or more blanket status mappings, each mapping correlating a characteristic of the space with the blanket in the open position or the blanket in the closed position; 4) receiving data including measurements of the characteristics of the space; and, 5) operating a graphics generator to prepare a presentation comprising the characteristics of the space as correlated to the blanket status mappings and a calculation of a penalty fee corresponding to a period of time during which the blanket is in the open position.

Figure 7:
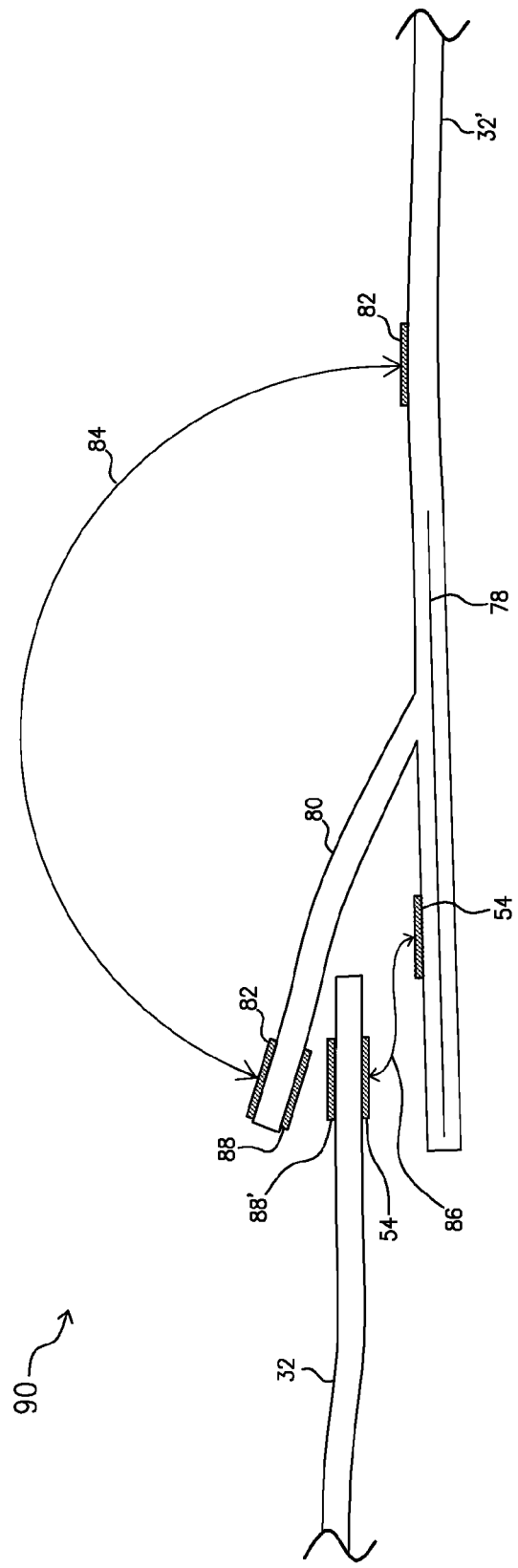

FIG. 7 shows an exemplary overlap design 90 for two blanket panels 32/32'. Side margin of panel 32 comprises conductive hook and loop fastener 54. Panel 32' has a Y-shaped side margin formed by flap 80. Non-conductive hook and loop fasteners 82 are attached to the end of flap 80, with corresponding fasteners 82 on the panel 32' to permit a user to move flap 80 out of the way when closing the blanket panels 32/32'. Arrow 84 shows a direction of movement of the flap 80 from an open position, in which hook and loop fasteners 82 are secured together, to a closed position with magnets 88/88' of opposed polarities pulling the flap 80 against the panel 32. Arrow 86 shows the direction of movement of panel 32 against panel 32' for connection of the conductive hook and loop fasteners 54, thus completing the circuit. The side margin of panel 32' contains a continuous polyvinyl chloride (PVC) or other rigid material panel strip 78 within the blanket layers on one end of the blanket. The PVC strip is approximately ¼ inches thick and four to six inches wide. The overlap design 90 shown in FIG. 7 may be positioned at the center of the door opening, for example, when the panels 32/32' are substantially equal in size, or proximate a side margin of the unit.

Referring to FIG. 7, to close the panels 32/32' upon departure of a unit, a user standing outside the unit steps on a foot tab 76 (shown in FIG. 2) to keep the margin of panel 32' taut. While maintaining pressure on tab 76, the user manually pulls flap 80 with sufficient force to disconnect magnets 88/88' and folds the flap 80 against panel 32' to connect the hook and loop fasteners 82 as shown by directional arrow 84. Next, the user attaches the panels 32/32' at the conductive hook and loop fasteners 54 by movement shown at arrow 86. The user then replaces flap 80 against panel 32 to securely close the connection between the panels 32/32'. A light indicator 74 (shown in FIG. 2) emits light when the conductive fasteners 54 have been adequately joined, thereby signaling to the user that the system is adequately closed.

INDUSTRIAL APPLICABILITY

It is clear that the inventive Temperature Retention and Weatherization Blanket System of this application has wide applicability to the storage unit industry, namely to reduce daily and seasonal temperature fluctuations within the storage space at minimal cost and minimal interference with existing doors, and, at the operator's discretion, to offer the operator an additional income source for systems inadvertently left open upon the renter's departure.

It should be understood that various modifications within the scope of this invention can be made by one of ordinary skill in the art without departing from the spirit thereof and without undue experimentation. This invention is therefore to be defined as broadly as the prior art will permit, and in view of the specification if need be, including a full range of current and future equivalents thereof.

I claim:

1. A weatherization system for a constructed space generally defined by two side walls, a back wall, a ceiling, a floor, a door opening, a door, and a door roll up assembly proximate the ceiling capable of raising and lowering the door, said system comprising:
- a thermal blanket spanning the door opening, said blanket having opposed top, bottom and side margins, a first side and an opposed second side;
- a support assembly spanning the door opening and retaining the top margin of the blanket in a generally vertical orientation spaced proximate the door opening, said assembly capable of retaining the blanket in an open position and a closed position;
- wherein the blanket is constructed from a plurality of layered materials rendering the first side of the blanket with a primarily heat reflective quality and the second side of the blanket with a primarily wind resistant quality;
- a set of insulation board panels mounted to a frame enclosing the roll up assembly;
- a sensor interface to sense data comprising an open position or a closed position of the blanket; and,
- a computer processor programmed to:
    - calculate a period of time for the blanket in the open position based on the sensor data;
    - calculate and display a penalty fee corresponding to the period of time of the blanket in the open position;
    - generate a graphical representation of the period of time for the blanket in the open position, and
    - charge the penalty fee to a user of the space.

2. The system of claim 1, further comprising a panel of thermal blanket mounted to the set of insulation board panels.

3. The system of claim 1, wherein the first side of the blanket is mounted within the support assembly facing the space for a period of time characterized by a generally cold climate external to the space.

4. The system of claim 1, wherein the second side of the blanket is mounted within the support assembly facing the space for a period of time characterized by a generally warm climate external to the space.

5. The system of claim 1, wherein an orientation of the first and second sides of the blanket is chosen by a user in association with a seasonal change in a climate external to the space.

6. A weatherization system for a constructed space generally defined by two side walls, a back wall, a ceiling, a floor, a door opening, a door and a door roll up assembly proximate the ceiling capable of raising and lowering the door, said system comprising:
- a thermal blanket spanning the door opening, said blanket having opposed top, bottom and side margins, a first side and an opposed second side;
- a support assembly spanning the door opening and retaining the top margin of the blanket in a generally vertical orientation spaced proximate the door opening, said assembly capable of retaining the blanket in an open position and a closed position;
- wherein the blanket is constructed from a plurality of layered materials rendering the first side of the blanket with a primarily heat reflective quality and the second side of the blanket with a primarily wind resistant quality;
- a set of insulation board panels mounted to a frame enclosing the roll up assembly;
- a sensor interface in association with the blanket to receive data including measurements of the characteristics of the space;
- a computer processor programmed with one or more mappings;
- each mapping correlating a characteristic of the space with a desired predetermined physical characteristic of the space;
- the computer processor further programmed to:
    - generate a graphical representation of the characteristics of the space as correlated to the mappings;
    - calculate a period of time for the blanket in the open position based on the sensor data;
    - calculate and display a penalty fee corresponding to the period of time of the blanket in the open position;
    - generate a graphical representation of the period of time for the blanket in the open position, and
    - charge the penalty fee to a user of the space.

7. The system of claim 6, wherein the physical characteristics comprise: a blanket in an open position, a blanket in a closed position, a temperature range, a minimum temperature; a maximum temperature; a humidity level, an emission of light, an odor, a sound, a localized heat source, a presence of smoke.

8. The system of claim 6, further comprising a light indicator in operative combination with the sensor interface.

9. The system of claim 6, wherein the presentation of the characteristics as correlated to the mappings comprises a status report comprising a calculation of an open period of time representing the blanket in the open position, and a closed period of time representing the blanket in a closed position.

10. The system of claim 6, wherein the sensor interface comprises a conductive hook and loop fastener material.

11. The system of claim 6, wherein the sensor interface comprises a sensor in operative combination with a latch for the door.

12. The system of claim 6, wherein the blanket comprises a region of overlap generally central to the door opening, said region defined by a portion of a first blanket panel resting against a portion of a second blanket panel.

13. The system of claim 6, wherein the blanket comprises a region of overlap with a first blanket panel capable of insertion and attachment to a second blanket panel within a generally Y-shaped margin formed in the second blanket panel, a portion of said margin reinforced with a rigid strip panel.

14. The system of claim 6, wherein the blanket comprises two panels capable of attachment by conductive hook and loop fastener.

* * * * *